United States Patent [19]

Dussourd

[11] Patent Number: 4,886,530

[45] Date of Patent: Dec. 12, 1989

[54] SINGLE STAGE PUMP AND SEPARATOR FOR TWO PHASE GAS AND LIQUID MIXTURES

[75] Inventor: Jules L. Dussourd, Princeton, N.J.

[73] Assignee: Sundstrand Corporation, Rockford, Ill.

[21] Appl. No.: 114,238

[22] Filed: Oct. 28, 1987

[51] Int. Cl.$^4$ .............................................. B01D 19/00
[52] U.S. Cl. ....................................... 55/199; 55/203; 55/406; 415/169.9
[58] Field of Search .............. 210/188, 250; 415/168, 415/121 A; 55/199, 203, 52, 88, 400–406

[56] References Cited

U.S. PATENT DOCUMENTS

| | | |
|---|---|---|
| 1,993,944 | 3/1935 | Peebles . |
| 2,511,150 | 6/1950 | Edwards . |
| 2,575,315 | 11/1951 | Edwards . |
| 2,610,788 | 9/1952 | Edwards . |
| 3,887,342 | 6/1975 | Bunnelle ............................... 55/203 |
| 4,088,459 | 5/1978 | Tuzson ................................... 55/203 |
| 4,273,562 | 6/1981 | Niskanen . |
| 4,410,337 | 10/1983 | Gullichsen et al. .............. 55/203 X |
| 4,481,020 | 11/1984 | Lee et al. ............................... 55/203 |
| 4,637,778 | 1/1987 | Pollari ............................. 415/168 X |

*Primary Examiner*—David L. Lacey
*Assistant Examiner*—Thi Dang
*Attorney, Agent, or Firm*—Wood, Dalton, Phillips, Mason & Rowe

[57] ABSTRACT

Difficulties in pumping mixtures of gases and liquids are avoided in a rotary machine which both pumps and separates the mixture and which includes a generally tubular, elongated pump housing 10 having a suction inlet 22 at one end, a first outlet 32 for gas at the other end, and a second outlet 58 for liquid intermediate the ends but in close adjacency to the outlet 32. The first outlet 32 is primarily axially directed and the second outlet 58 is primarily radially directed. An elongated rotor 30 is disposed within the housing and is disposed between the ends. The rotor 30 has a length to diameter ratio substantially in excess of one. A plurality of generally axially elongated, radially extending vanes 62 are carried by the rotor 30 and the second outlet 58 is surrounded by a volute 40.

4 Claims, 2 Drawing Sheets

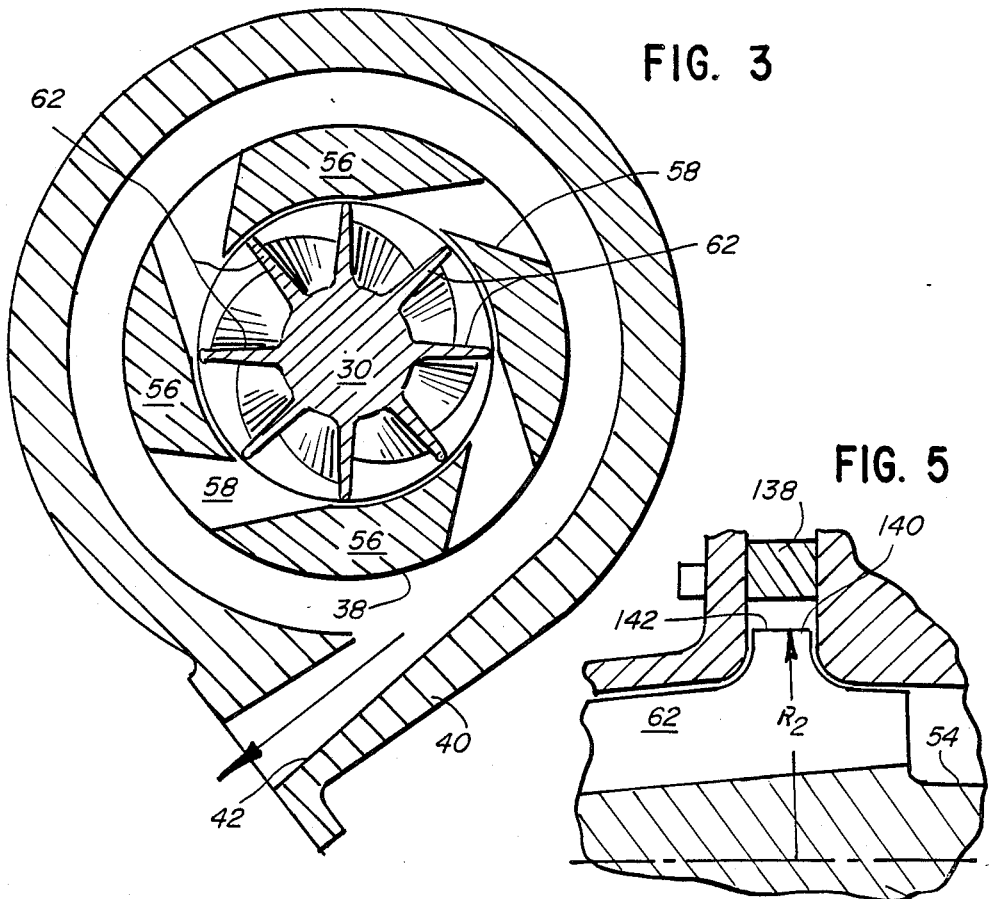
FIG. 3
FIG. 5
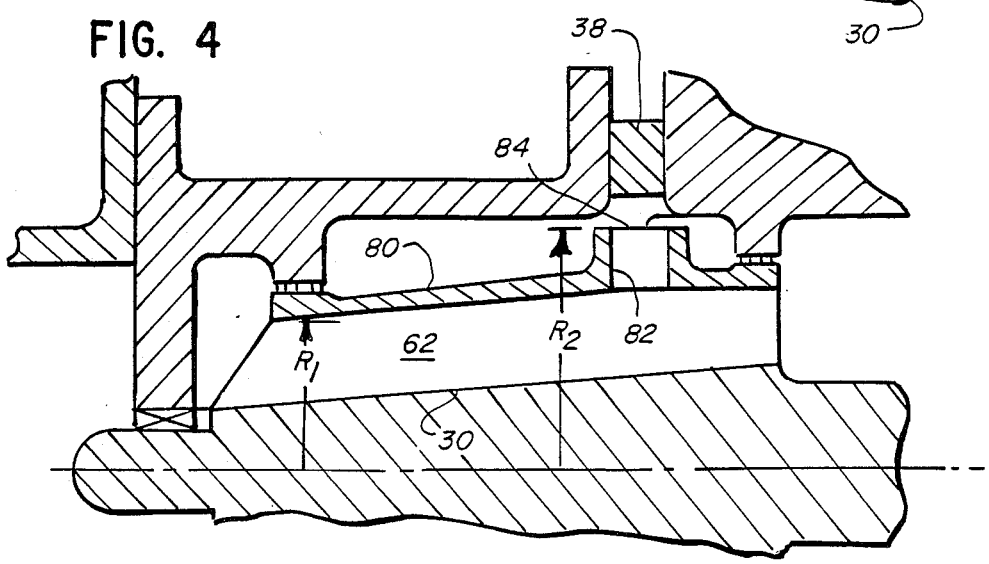
FIG. 4

SINGLE STAGE PUMP AND SEPARATOR FOR TWO PHASE GAS AND LIQUID MIXTURES

FIELD OF THE INVENTION

This invention relates to a combination pump and separator for separating liquid from gas in a two phase mixture, and more specifically, to such a pump and separator that operates, in a single stage, to pump and separate the phases of foams, froths and bubbly liquids.

BACKGROUND OF THE INVENTION

Pumping of two phase fluid mixtures of liquid and gas such as foams, froths, and bubbly liquids, is much more difficult than the pumping of single phase fluids such as gas or liquid. Two phase fluids such as those enumerated exhibit properties which change rapidly according to the void fraction occupied by the gaseous phase. Moreover, it is extremely difficult to maintain a homogeneous mixture of the two phases in conventional pumps. Changes in the void fraction result from segregation of the various fluids by reason of the action of inertia forces, gravity or shear forces and are generally unavoidable in almost any application. They are also induced by pressure changes or slips between the velocities of the two phases that are attempted to be pumped. In any event, the net effect is that the actual properties of the mixture at any point inside the pump are poorly known with the ultimate result that it is difficult to design the pump geometry to handle the fluid because of its uncertain properties.

Consequently, in many instances, the pump performance simply breaks down when the void fraction reaches a certain level and fluid delivery ceases altogether. Continued operation of the pump results in high vibration and noise levels.

To avoid these difficulties, the prior art has generally attempted to try to maintain the state of the two phase mixture in a homogenous form in which the gas content is uniformly and finely dispersed throughout the liquid as uniformly as possible. Typically, this is attempted to be achieved by inducing high levels of turbulence. In other attempts at solution of the problem, separation of the phases has been attempted with independent and separate pumping devices for each phase. Frequently these methods are capable of producing some degree of improvement but often they work with one type of mixture and not with another.

The present invention is directed to overcoming one or more of the above problems.

SUMMARY OF THE INVENTION

It is the principal object of the invention to provide a new and improved combination pump and separator for foams, froths and bubbly liquids. More specifically, it is an object of the invention to provide a rotary machine to accomplish such functions and which does not seek to pump both phases to a higher pressure level, but rather, has the capability of operating over a wide range of void fractions including a void fraction of zero, i.e. 100% liquid.

The invention is generally intended (but not limited to) for pumping oils and separating gas therefrom. Such oils, as a result of churning or changes in ambient pressure may be loaded with gas bubbles to the extent that the volume of gas may be up to 20 to 50 times the volume of the liquid.

An exemplary embodiment of the invention achieves the foregoing object in a construction including a generally tubular, elongated pump housing having a suction inlet at one end, a first outlet primarily for gas at the other end and a second outlet for liquid intermediate the ends but in close adjacency to the other end. The first outlet is primarily axially directed and the second outlet is primarily radially directed. An elongated rotor is disposed within the housing and extends between the ends. The rotor has a length to diameter ratio substantially in excess of one and is provided with a plurality of generally axially elongated, radially extending vanes. A volute is provided to surround the second outlet.

As a result of the configuration, the two phase fluid being pumped has a long residence time within the pump and a high and strong centrifugal field is generated by the rotor so as to centrifuge the liquid phase outwardly to overcome the surface tension and viscous forces that exist between the liquid and the gas and tend to maintain the mixture. The resulting vigorous centrifuging of the liquid during the long residence time assures that the liquid exits the rotor at a pressure sufficiently high as to allow the machine to act as a pump. The gas and some residual liquid may be discharged axially outwardly through the first outlet.

In a preferred embodiment, the vanes on the rotor adjacent the inlet end are configured to provide an inducer section and, adjacent the first outlet end are configured to provide an exducer section. This configuration assures that the two phase mixture is readily drawn into the pump by the inducer section and that the high level of energy imparted to the fluid fraction that does not exit the second outlet is partially recovered by the exducer section to minimize energy expenditures in operating the machine.

A preferred embodiment also contemplates there be a diffuser located between the volute and the second outlet.

In one embodiment of the invention, a generally cylindrical shroud is disposed about the rotor at the radially outer extremities of the vanes and has a radial outlet axially aligned with the second outlet. This form of the invention assures that the mixture to be pumped and separated is subject to the high centrifugal field generated by the rotor without excessive churning at the interface of the rotor and the pump housing.

Other objects and advantages will become apparent from the following specification taken in connection with the accompanying drawings.

DESCRIPTION OF THE DRAWINGS

FIG. 3 is a fragmentary sectional view taken approximately along the lines 3—3 in FIG. 1;

FIG. 4 is a sectional view similar to FIG. 1 but of a modified embodiment of the invention; and FIG. 5 is a fragment of a sectional view similar to FIG. 1 but of still another modified embodiment of the invention.

DESCRIPTION OF THE PREFERRED EMBODIMENTS

Figure 1:
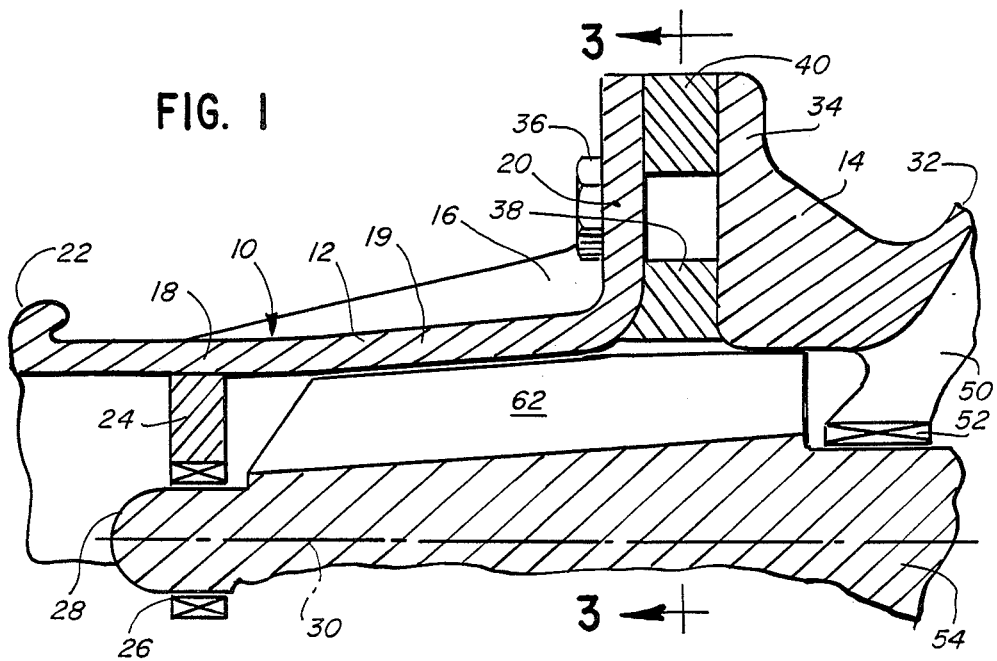
FIG. 1 is a sectional view of a pump and separator made according to the invention.

An exemplary embodiment of the combination pump and separator made according to the invention is illustrated in the drawings and with reference to FIG. 1 includes a pump housing, generally designated 10 comprised of first and second, generally tubular castings 12 and 14. The casting 12 is substantially elongated as may be seen in FIG. 1 and includes strengthening webs 16 at various locations between a cylindrical section 18 a frustoconical section 19 and a radial end flange 20.

At its end opposite the flange 20, the casting 12 includes a circular inlet 22. Interiorally, it includes a plurality of generally radially extending struts 24 which terminate in a cylindrical bearing 26 for supporting one end 28 of a rotor 30.

An outlet from the pump housing 10 is defined by an end 32 on the casting 14 remote from a radial end flange 34 thereon which is alignable with the flange 20.

Any suitable means such as bolts 36 extend between the flanges 34 to secure the two castings 12 and 14 together. In the process, the flanges 34 sandwich a conventional pump diffuser 38 as well as a spiral or scroll-like volute 40. The scroll-like volute 40 is best seen in section in FIG. 3 and has an outlet 42. The purposes of the construction will be stated in greater detail hereinafter.

The casting 14 also includes radially inwardly directed struts 50 which are generally similar to the struts 24 and which also terminate in a cylindrical bearing 52 for journalling another end 54 of the rotor 30. Typically, the end 54 extends beyond the location illustrated in FIG. 1 to some source of rotational energy such as a motor or the like (not shown).

Turning now to FIG. 3, the diffuser 38 is composed of alternating solid sections 56 and tangentially opening ports 58. The ports 58 extend from the interior of the pump housing 10 to the interior of the volute 40 and thus serve to establish fluid communication between the interior of the pump housing 10 and the outlet 42 from the volute 40. It is to be particularly noted that the ports 58 are in close adjacency to the outlet end 32 on the casting 14 as shown in FIG. 1. They are quite remote from the inlet end 22 on the casting 12 and the diameter of the housing 12 along with characteristics of the rotor 30 to be described hereinafter is such that a relatively high housing length to rotor diameter ratio is defined when considered from the inlet 22 to the outlet provided by the ports 58. This length to diameter ratio will always be substantially in excess of one and typically will be on the order of four or more. The purpose of the same is to provide a long residence time for the two phase liquid entering the pump through the inlet 22.

Figure 2:
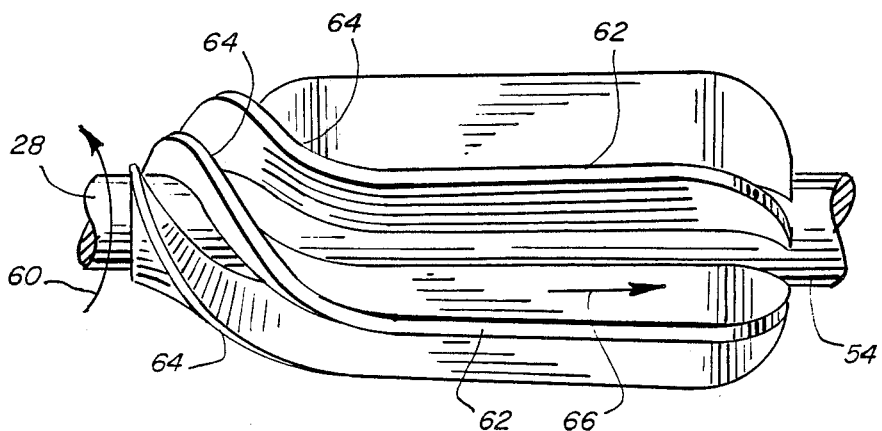
FIG. 2 is an elevational view of a rotor utilized in the combination pump and separator.

As best seen in FIG. 2, the rotor 30 is adapted to rotate in the direction of an arrow 60. It is also provided with axially elongated, radially entending vanes 62. In a preferred embodiment, near the inlet end 28 of the rotor 30, the vanes 62 have sections 64 curved in a direction toward the direction of rotation indicated by the arrow 60. As a consequence, the vane sections 64 act as inducers to create a suction or partial vacuum at the inlet 22 to induce a two phase fluid into entering the pump housing 10. Stated another way, the curved section 64 of the vanes 62 define an inducer section on the rotor 30.

At the opposite end of the vanes 62, the same are provided with a curved configuration 66 which is curved oppositely of the direction of rotation of the rotor 30. As a consequence, fluid flowing axially between the vanes 62 in the direction of an arrow 68 will impinge upon the curved sections 66 and thus add impetus to rotation of the rotor 30 in the direction of the arrow 60. Stated another way, the curved sections 66 are exducer sections which recover a certain amount of the energy applied to the two phase mixture entering the pump. The outer diameter of the rotor increases from the end 28 to the end 54 so as to follow the increasing diameter of the frustoconical section 19 of the pump housing 10 for purposes to be seen.

As will be appreciated from the following description of operation of the pump and separator, a liquid will exit the pump through the ports 58 which thus serve as an outlet for liquid whereas a fluid which is primarily gas but may contain a certain amount of liquid will exit the pump axially through the outlet 32.

In operation, a strong centrifugal field is created by the rotor so as to centrifuge the liquid in the two phase mixture radially outwardly to overcome surface tension and viscous forces that tend to hold the liquid and the gas together. The vigorous centrifuging providing separation of the liquid is enhanced by the long residence time provided by the high length to diameter ratio. The separated liquid flows radially outwardly through the ports 58 in the diffuser 38 and as a result of the action of the latter, creates a substantial pressure head at the outlet 42 from the volute 40.

Gas does not follow the same path because the dynamic forces acting upon it are insufficient to build up the energy level in the gas to overcome the high pressure resulting from the action of the diffuser 38 on the liquid. Consequently, only the liquid phase is pumped radially outwardly and the remainder of the material which is primarily gas and includes a certain amount of liquid is discharged axially. From its discharge at the outlet 32, the material may be returned to a reservoir and recycled through the pump.

The vane configurations including the curved inducer section 64 assure induction of the two phase mixture into the pump whereas energy requirements are minimized by energy recovery resulting from the provision of the exducer curves 66 on the vanes 62.

In some instances, greater efficiencies may be achieved by eliminating the possibility of churning losses at the interface of the vanes 62 and the interiors of the castings 12 and 14. This may be accomplished by providing a frustoconical shroud at the radially outer edges of the vanes 62 as shown in FIG. 4. Such a shroud is designated 80 and includes one or more discharge openings 82 that are axially aligned with the diffuser 38. Use of the shroud 80 maintains the incoming two phase mixture in a generally axial flow while allowing the strong centrifugal forces to act to effectively separate without subjecting the liquid to shear at the interface of the pump housing 10 and the rotor 30 simply because flow of the liquid to the interface is restrained by this shroud 80.

It will be observed from FIG. 4 that the discharge openings 82 have discharge edges 84 that are located considerably radially outward of the minimum inner diameter of the shroud 80. Compare $R_1$ representing the latter with $R_2$ representing the former.

Assuming a constant rotor speed and minimum radius, $R_1$, the greater the ratio of $R_2$ to $R_1$, the higher the pressure at the outlet port 42. This is due to the fact that rotor tip speed will be relatively higher. It is for this reason, an increase in $R_2/R_1$, that the section 19 may be made frustoconical with the outer diameter of the rotor 30 of the embodiment of FIG. 1 following the same as well.

Where even greater pressures are required of a embodiment of the type of FIG. 1, the modification illustrated in FIG. 5 may be employed. As seen therein, a diffuser 138 is located somewhat more radially outward than in the embodiment of FIG. 1 and each of the vanes 62 is provided with a radially outwardly extending tab or tongue 140 that extends between the flanges 20 and 34 to terminate in a discharge edge 142 in close proximity to the diffuser 138. By this structure, the ratio of $R_2$ to $R_1$ may likewise be increased to obtain high pressures.

Conversely, when high volume delivery is desired, the embodiment of FIG. 1 may be employed; and that may be modified to achieve even higher volume deliveries by eliminating a frustoconical section 19 in favor of a cylindrical section so that ratio $R_2$ to $R_1$ will be equal to one.

From the foregoing, it will be appreciated that a combination pump and separator made according to the invention operates in a single phase and with considerable simplicity. Furthermore, because the pump relies on a high centrifugal field to effect separation as opposed to relying on high pressure levels, the pump is ideally suited for use with any of a large variety of two phase mixtures and therefore is capable of working with many different types of mixture in contrast to prior are devices which do not have the same capability.

The rotary machine of the present invention is highly desirable, moreover, because of its ability to extract energy from the gas and liquid mixture being discharged axially after effecting separation of the majority of the liquid from the mixture to provide enhanced energy efficiency.

Finally, the construction of the pump lends itself to relatively easy variation of the ratio of $R_2$ to $R_1$ during the design process, thereby allowing the principles of the invention to be readily extended both to low pressure, high volume pumps and high pressure low volume pumps as well as a whole multitude of pumps in between.

I claim:

1. A rotary machine for separating a two-phase mixture of a gas and a liquid and for pumping the liquid to a desired location, said machine comprising:
    a generally tubular, elongated pump housing including a rotor receiving opening having a suction inlet on said opening at one end, a first outlet on said opening primarily for gas at the other end, and a second outlet on said opening for liquid intermediate said ends but in close adjacency to said other end;
    said first inlet being primarily axially directed;
    said second outlet being radially directed;
    an elongated rotor disposed within said housing opening and extending between said ends, said rotor having a length to diameter ratio substantially in excess of one;
    a plurality of generally axially elongated, radially extending vanes carried on said rotor for rotation therewith, said vanes adjacent said one end being configured to provide an inducer section and adjacent said other end being configured to provide an exducer section;
    a volute connected to said pump housing and surrounding said second outlet; and
    a diffuser between said volute and said second outlet.

2. A rotary machine for separating a two-phase mixture of a gas and a liquid and for pumping the liquid to a desired location, said machine comprising:
    a generally tubular, elongated pump housing including a rotor receiving opening having a suction inlet on said opening at one end, a first outlet on said opening primarily for gas at the other end, and a second outlet on said opening for liquid intermediate said ends but in close adjacency to said other end;
    said first inlet being primarily axially directed;
    said second outlet being radially directed;
    an elongated rotor disposed within said housing opening and extending between said ends, said rotor having a length to diameter ratio substantially in excess of one;
    a plurality of generally axially elongated, radially extending vanes carried on said rotor for rotation therewith, said vanes adjacent said one end being configured to provide an inducer section and adjacent said other end being configured to provide an exducer section;
    a volute connected to said pump housing and surrounding said second outlet; and
    a generally cylindrical shroud positioned and arranged about said rotor at the radially outer extremities of said vanes, said shroud having a radial outlet axially aligned with said second outlet.

3. A rotary machine for separating a two phase mixture of a gas and a liquid and for pumping the liquid to a desired location, said machine comprising:
    a generally tubular, elongated pump housing including a rotor receiving opening having a suction inlet on said opening at one end, a first outlet on said opening primarily for gas at the other end and a second outlet on said opening for liquid intermediate said ends but in close adjacency to said other end;
    said first outlet being primarily axially directed;
    said second outlet being radially directed;
    an elongated rotor disposed within said housing opening and extending between said ends, said rotor having a length to diameter ratio substantially in excess of one;
    a plurality of generally axially elongated, radially extending vanes carried on said rotor for rotation therewith;
    a generally cylindrical shroud positioned and arranged about said rotor at the radially outer extremities of said vanes, said shroud having a radial outlet axially aligned with said second outlet; and
    a volute surrounding said second outlet.

4. The rotary machine of claim 3 wherein said vanes, adjacent said other end are circumferentially curved away from the intended direction of rotation of said rotor so as to be impacted by fluid traveling to said first outlet to add impetus to rotation of said rotor.

* * * * *